US012792140B2

(12) United States Patent
Ji et al.

(10) Patent No.: US 12,792,140 B2
(45) Date of Patent: Nov. 10, 2026

(54) SYSTEM AND METHOD FOR EFFICIENT PAIRING OF MIXED-REALITY DEVICES USING GAZE TRACKING

(71) Applicants: VIRGINIA TECH INTELLECTUAL PROPERTIES, INC., Blacksburg, VA (US); MONTCLAIR STATE UNIVERSITY, Montclair, NJ (US)

(72) Inventors: Bo Ji, Blacksburg, VA (US); Matthew Corbett, Christiansburg, VA (US); Jiacheng Shang, Secaucus, NJ (US)

(73) Assignees: VIRGINIA TECH INTELLECTUAL PROPERTIES, INC.; MONTCLAIR STATE UNIVERSITY

( * ) Notice: Subject to any disclaimer, the term of this patent is extended or adjusted under 35 U.S.C. 154(b) by 11 days.

(21) Appl. No.: 18/998,090

(22) PCT Filed: Jul. 20, 2023

(86) PCT No.: PCT/US2023/070592
§ 371 (c)(1),
(2) Date: Jan. 23, 2025

(87) PCT Pub. No.: WO2024/020489
PCT Pub. Date: Jan. 25, 2024

(65) Prior Publication Data

US 2026/0244265 A1 Aug. 20, 2026

Related U.S. Application Data

(60) Provisional application No. 63/369,006, filed on Jul. 21, 2022.

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G02B 27/0172* (2013.01);
(Continued)

(58) Field of Classification Search
CPC .......... G06F 3/013; G06F 1/163; G06F 3/017; G06F 3/04815; G06F 3/04817;
(Continued)

(56) References Cited

U.S. PATENT DOCUMENTS

2003/0076300 A1* 4/2003 Lauper .................... G06F 21/36 345/158
2016/0093108 A1 3/2016 Mao et al.
(Continued)

OTHER PUBLICATIONS

International Search Report and Written Opinion for PCT/US23/70592 mailed Dec. 7, 2023.

*Primary Examiner* — Hong Zhou
(74) *Attorney, Agent, or Firm* — Perilla Knox & Hildebrandt LLP; Jonathan A. Paulis

(57) ABSTRACT

Disclosed are various embodiments that facilitate efficient pairing of mixed-reality devices using gaze tracking. In one embodiment, a host device and at least one client device are identified from a plurality of computing devices. A key sequence cue is communicated to a first user via the host device. A graphical display is simultaneously presented via each of the computing devices with a plurality of indicia distributed across the graphical display. Eye gazes of the first user and at least one second user are tracked using a respective gaze tracking sensor of the computing devices. The eye gaze traces a sequence of a subset of the indicia corresponding to the key sequence cue. A cryptographic key is generated based at least in part on the eye gaze of the first user and the second user(s).

20 Claims, 12 Drawing Sheets

(51) Int. Cl.

| | |
|---|---|
| ***G02B 27/01*** | (2006.01) |
| ***G06F 1/16*** | (2006.01) |
| ***G06F 3/04815*** | (2022.01) |
| ***G06F 3/04817*** | (2022.01) |
| ***G06F 21/44*** | (2013.01) |
| ***G06F 21/84*** | (2013.01) |

(52) U.S. Cl.

CPC .............. *G06F 1/163* (2013.01); *G06F 3/017* (2013.01); *G06F 3/04815* (2013.01); *G06F 3/04817* (2013.01); *G06F 21/44* (2013.01); *G06F 21/84* (2013.01); *G02B 2027/014* (2013.01); *G02B 2027/0174* (2013.01); *G06F 2221/2129* (2013.01)

(58) Field of Classification Search

CPC .. G06F 21/44; G06F 21/84; G06F 2221/2129; G02B 27/0093; G02B 27/0172; G02B 2027/014; G02B 2027/0174

See application file for complete search history.

(56) References Cited

U.S. PATENT DOCUMENTS

| | | | | |
|---|---|---|---|---|
| 2017/0032573 | A1* | 2/2017 | Dow | G06F 21/606 |
| 2017/0134950 | A1* | 5/2017 | Goldman | H04M 1/6041 |
| 2018/0089417 | A1 | 3/2018 | Liu et al. | |
| 2021/0133305 | A1 | 5/2021 | Mistry | |

* cited by examiner

SYSTEM AND METHOD FOR EFFICIENT PAIRING OF MIXED-REALITY DEVICES USING GAZE TRACKING

CROSS-REFERENCE TO RELATED APPLICATIONS

This application is a national stage application under 35 U.S.C. § 371 of International Application No. PCT/US2023/070592, filed Jul. 20, 2023, titled "SYSTEM AND METHOD FOR EFFICIENT PAIRING OF MIXED-REALITY DEVICES USING GAZE TRACKING," which claims the benefit of, and priority to, U.S. Provisional Application No. 63/369,006, entitled "SYSTEM AND METHOD FOR EFFICIENT PAIRING OF MIXED-REALITY DEVICES USING GAZE TRACKING" and filed on Jul. 21, 2022, both of which are herein incorporated by reference in their entirety.

BACKGROUND

According to recent market research, the global Augmented Reality (AR) market in 2021 was estimated at $14.7 Billion, with an expected value of $88.4 Billion by 2026. As companies and users begin to explore the possibilities of the Metaverse and the future of human interaction, AR is rapidly expanding past its current hardware limitations to even more ubiquitous use. These uses, such as in the windshields of automobiles, use by the military for soldier augmentation, performing remote surgery and training healthcare workers, educating children in the classroom, and visualizing logistics bottlenecks, portend a future where AR devices are used as a part of our normal, every-day lives. With the advent of the Metaverse, even the governments of large cities are turning to AR to ensure that their citizens have access to essential services through this emerging and potentially pervasive technology.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method for pairing a plurality of computing devices. The computer-implemented method also includes identifying a host device and at least one client device from the plurality of computing devices. The method also includes communicating a key sequence cue to a first user via the host device. The method also includes simultaneously presenting a graphical display via each of the plurality of computing devices with a plurality of indicia distributed across the graphical display. The method also includes tracking an eye gaze of the first user and at least one second user using a respective gaze tracking sensor of the plurality of computing devices, the eye gaze tracing a sequence of a subset of the plurality of indicia corresponding to the key sequence cue. The method also includes generating a cryptographic key based at least in part on the eye gaze of the first user and the at least one second user. Other embodiments of this aspect include corresponding computer systems, apparatus, and computer programs recorded on one or more computer storage devices, each configured to perform the actions of the methods.

Implementations may include one or more of the following features. Each indicium of the plurality of indicia may correspond to a different hologram associated with a corresponding symbol. The computer-implemented method may include instructing the first user to communicate the key sequence cue verbally to the at least one second user. The graphical display may be presented to the first user and the at least one second user via respective head-mounted display devices. The computer-implemented method may include: generating data encoding the plurality of indicia by the host device; and sending the data encoding the plurality of indicia to the at least one client device. Generating the cryptographic key further may include generating a respective symmetric encryption key in each of the plurality of computing devices based at least in part on the eye gaze of a respective user and the sequence of the subset of the plurality of indicia corresponding to the key sequence cue. The computer-implemented method further may include: sending a respective ciphertext from the at least one client device to the host device, the respective ciphertext being encrypted using the respective symmetric encryption key generated in the at least one client device; verifying, by the host device, whether the respective ciphertext is decryptable using the respective symmetric encryption key generated by the host device; and pairing, by the host device, the at least one client device in response to determining that the respective ciphertext is decryptable using the respective symmetric encryption key generated by the host device. Presenting the graphical display via each of the plurality of computing devices with the plurality of indicia distributed across the graphical display further may include randomly distributing the plurality of indicia across the graphical display.

The computer-implemented method may include discretizing the eye gaze according to a grid of three-dimensional spaces corresponding to potential locations of the plurality of indicia. Tracking the eye gaze of the first user and the at least one second user further may include determining that a respective user has completed a respective air tap gesture at each indicium of the sequence of the subset of the plurality of indicia. Tracking the eye gaze of the first user and the at least one second user further may include determining that a respective user has completed a respective eye gaze dwell time at each indicium of the sequence of the subset of the plurality of indicia. The key sequence cue may be a sequence of one to ten digits, from 0 to 9. Generating the cryptographic key further may include generating a symmetric encryption key using a password-based key derivation function version 2. Identifying the host device and the at least one client device from the plurality of computing devices further may include sending a network address of the host device to a network via a user datagram protocol (UDP) broadcast. Implementations of the described techniques may include hardware, a method or process, or computer software on a computer-accessible medium.

One general aspect includes a system for pairing computing devices. The system also includes a plurality of computing devices including a host device and at least one client device, the plurality of computing devices being configured to at least: communicate a key sequence cue to a first user via the host device; simultaneously present a graphical display via each of the plurality of computing devices with a plurality of indicia distributed across the graphical display; track an eye gaze of the first user and at least one second user using a respective gaze tracking sensor of the plurality of computing devices, the eye gaze tracing a sequence of a subset of the plurality of indicia corresponding to the key sequence cue; and generate a cryptographic key based at least in part on the eye gaze of the first user and the at least one second user. Other embodiments of this aspect include corresponding computer systems, apparatus, and computer programs recorded on one or more computer storage devices, each configured to perform the actions of the methods.

Implementations may include one or more of the following features. Generating the cryptographic key further may include generating a respective symmetric encryption key in each of the plurality of computing devices based at least in part on the eye gaze of a respective user and the sequence of the subset of the plurality of indicia corresponding to the key sequence cue. The plurality of computing devices may be further configured to at least: send a respective ciphertext from the at least one client device to the host device, the respective ciphertext being encrypted using the respective symmetric encryption key generated in the at least one client device; verify, by the host device, whether the respective ciphertext is decryptable using the respective symmetric encryption key generated by the host device; and pair, by the host device, the at least one client device in response to determining that the respective ciphertext is decryptable using the respective symmetric encryption key generated by the host device.

The plurality of computing devices may be further configured to at least discretize the eye gaze according to a grid of three-dimensional spaces corresponding to potential locations of the plurality of indicia. Tracking the eye gaze of the first user and the at least one second user further may include at least one of: determining that a respective user has completed a respective air tap gesture at each indicium of the sequence of the subset of the plurality of indicia; or determining that the respective user has completed a respective eye gaze dwell time at each indicium of the sequence of the subset of the plurality of indicia. Presenting the graphical display via each of the plurality of computing devices with the plurality of indicia distributed across the graphical display further may include randomly distributing the plurality of indicia across the graphical display. Implementations of the described techniques may include hardware, a method or process, or computer software on a computer-accessible medium.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
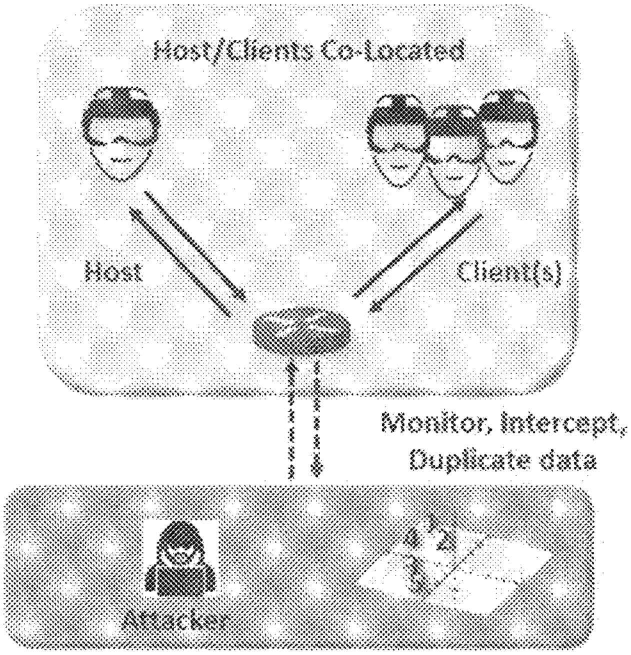
FIGS. 1A and 1B are drawings of example attack strategies against the security of the pairing system.

The present disclosure relates to efficient pairing of mixed-reality devices using gaze tracking. As Augmented Reality (AR) devices become more prevalent and commercially viable, the need for quick, efficient, and secure schemes for pairing these devices has become more pressing. Current methods to securely exchange holograms require users to send this information through large data centers, creating security and privacy concerns. Existing techniques to pair these devices on a local network and share information fall short in terms of usability and scalability. These techniques either require hardware not available on AR devices, intricate physical gestures, removal of the device from the head, do not scale to multiple pairing partners, or rely on methods with low entropy to create encryption keys.

Various embodiments of the present disclosure introduce an efficient, effective, and intuitive pairing protocol. This pairing protocol employs eye gaze tracking and a spoken key sequence cue (KSC) to generate a shared secret and the entropy required to create identical, independently generated symmetric encryption keys. This approach achieves marked improvements in the pairing success rate and pairing time over current methods. The pairing protocol may extend to multiple users, which also improves over existing techniques. In one implementation, the pairing protocol generates 64 bits of total entropy in the shared secret, improving on current techniques by six-fold. Additionally, the pairing protocol is easy to use for the end user, involving little more than a basic understanding of AR gestures for operation. Finally, these approaches can be used on any Mixed Reality (MR) device equipped with eye gaze tracking.

As AR devices grow in utility, use, and impact on daily lives, schemes to pair two or more of such devices will become even more important. The pairing of AR devices and sharing of experiences is at the core of the value of AR devices, allowing users to not only experience a synthetic augmentation of the physical world, but to share these objects, normally known as holograms, with others. On the other hand, AR devices present unique challenges and opportunities for pairing. AR devices, especially head mounted displays (HMDs), allow the user to interact with her physical environment while the headset places synthetic objects such as holograms into the user's perception of the physical world. HMDs also allow for integrated eye tracking. This feature allows for unique ways to generate the entropy required for secure pairing of these devices. This is in contrast to other mobile devices, such as smartphones, that have limited ways for users to interact for device pairing.

Local sharing allows users to communicate without using large-scale data backbones, for-profit cloud services, or cellular connections. It also gives users the freedom to decide to keep their data local, and within a more closed sphere of control. Currently, for two users to pair their AR devices and securely share information such as holograms, one approach involves exchanging an alphanumeric authentication string or using centralized cloud systems. Using alphanumeric strings is error-prone and time-consuming. Other approaches use AR's spatial awareness capability, combined with the AR user's ability to interact with the physical environment, to efficiently pair two AR devices. Each of these approaches involve wireless localization or holograms to authenticate a shared secret to secure communication paths without using Public Key Infrastructure (PKI) to create keys. However, these approaches do not implement or test methods of pairing more than two devices, and they do not involve using eye gaze tracking for AR device pairing. Additionally, such approaches may be specific to AR. AR-specific gestures or technologies require that each of these solutions be deployed to AR devices only, greatly limiting the deployability and scope of the solutions (e.g., not applicable to Virtual Reality (VR) devices). In light of this, it remains highly challenging to achieve a high level of entropy required for AR device pairing, while simultaneously creating a scalable, usable, and widely deployable solution.

Various embodiments of the present disclosure use eye gaze tracking to create the entropy required for secure pairing, and the usability and scalability desired by users. Eye gaze tracking offers several benefits. First, harnessing eye gaze simply involves the user directing their eyes, or look, at a target. Eye gaze tracking involves little explanation. Second, eye gaze tracking is a relatively new method of user interaction with digital systems with a great deal of potential. Eye gaze tracking enables features such as foveated rendering to improve device efficiency by only rendering locations in the augmented world that the user will see, and features to improve the security and usability of MR devices. Third, an AR user's eye gaze is nearly invisible to an outside observer. Most AR devices have a partially opaque visor concealing the user's eyes. This prevents easy, direct observation of the target of the user's gaze.

Using eye gaze for symmetric encryption key generation for pairing purposes, however, introduces unique challenges. First, eye gaze detection and logging may involve inherent error, even if small. As a result, the discretization of this data can be challenging. Eye saccades, the natural movement of the eye from point to point, eye fatigue, and even user inattentiveness make this and other techniques difficult to implement and discretize. Second, the transition of eye gaze data to a symmetric encryption key is nontrivial. The system should be robust and scalable (i.e., able to simultaneously pair more than two devices). Third, eye gaze and iris/retinal data can be uniquely identifying and are a potential privacy risk if leaked accidentally. Such a system should protect user identity and unique biometric data. Fourth, this system should use the created entropy to generate symmetric keys without involving key authentication systems that limit scalability. For example, the minimum entropy may be 60+ bits.

Various embodiments use a set of numerically labeled holograms, randomly generated in 3D space, and a spoken key sequence cue, to pair AR devices and mitigate the threat of Man in the Middle (MITM) attacks. These approaches can work for users wearing glasses or contacts, and with less than perfect vision, even when corrected. The embodiments do not need to publicly exchange discretization or error correction parameters, and do not involve recording or sharing gaze data that can jeopardize user privacy.

For testing purposes, the MICROSOFT HOLOLENS 2 AR HMDs are used to demonstrate that efficient and secure local pairing is possible using eye gaze tracking as the primary entropy source for symmetric keys. Currently, the Microsoft HoloLens 2 is the most advanced AR HMD on the market. It incorporates spatial awareness, eye gaze tracking, a relatively large field of view, and is completely wireless. While the prototype implementation may use MICROSOFT's Mixed Reality Toolkit (MRTK), the embodiments may be applicable to any MR device that supports eye gaze tracking.

Threats to security and privacy in MR may be divided into five categories: input protection, data protection, output protection, user interaction protection, and device protection. Input protection is the protection of the user's inputs (e.g., eye gaze and gestures) and the other objects created to enhance the user's experience. Data protection is the protection of data used to create the virtual world, such as spatial anchors which can identify the location of the anchor's creator in virtual and physical space. Output protection focuses on holograms and other artifacts created directly or indirectly by the user or device. Protecting user interactions deals with protecting collaborative experiences and the information shared by two or more users for an immersive, shared experience. Finally, device protection deals with security of the physical device. For our purposes, device pairing falls under the category of user interaction protection, but input protection may be addressed through ensuring the security of the user's eye gaze data.

The primary challenge to pairing mobile devices is authentication, or the ability to verify that the pairing partner is who and what the user expects it to be. One method proposed and used widely is out-of-band (OOB) communication to verify the intended pairing partner. Such a method allows users to independently verify that the exchanged cryptographic material (e.g., the keys) has not been intercepted or manipulated by a malicious third party through MITM attacks. Various out-of-band channels, such as human physiology, ambient signals and energy, simultaneous tapping to attenuate the received signal strength, and device acceleration all attempt to solve the MITM problem. None of these protocols incorporate the unique and powerful capabilities of current AR devices, or are otherwise inapplicable to AR uses. These protocols either focus on pairing multiple devices worn or used by a single user, or simply are inefficient in terms of user interaction and success rate. To further expand on this point, imagine trying to "shake" two AR headsets together to synchronize accelerometer data. This would involve users removing their AR devices, if worn, something not desirable in constant, immersive AR environments. Other techniques, such as APPLE's AIRDROP are difficult to ensure authentication, as evidenced by instances of "cyber flashing" using the technique. Even more techniques, such as WI-FI DIRECT involve either string exchange or tapping of buttons to initiate a session. Tapping buttons, again, could easily allow a MITM attacker to simultaneously tap an unwanted device, frustrating or hijacking the pairing attempt. Therefore, none of these techniques are particularly well-suited to pairing of AR devices, but understanding the breadth of possible communication channels, especially channels that can create entropy, is useful to understand on how to create an AR-specific technique that is efficient and effective.

An alternative approach uses facial recognition and wireless localization to authenticate shared keys and to pair AR devices. This technique is limited due to a lack of feasibility in current AR devices. This technique involves very specific network hardware to collect the wireless channel state information, which is critical to the wireless localization at the core of its protocol, that simply does not exist in most AR HMDs. Due to these issues, this technique has not been deployed to actual AR devices and cannot be effectively evaluated. This technique relies on facial recognition, tested using unobstructed sample faces from a dataset, printed on a sheet of paper and taped to an opposing laptop. Modern AR devices partially obscure the human face, greatly frustrating this assumption.

Another approach generates a secret locally on one device, creates a public key, transmits the key to a pairing partner, and authenticates this partner's key through a system of out-of-band physical interaction. This approach has two users trace the outline of a hologram created from the shared keys to validate the keys are identical, and wave as a way to prevent MITM attacks during transmission of the keys. The pairing initiator generates a hologram, comprising holographic line segments on their display, and verifies the tracing of this hologram by the pairing client. Physically tracing the line segments has both users immediately in front of the other, and uses the user's full attention throughout the verification process. Additionally, this approach allows users to simply accept the hologram verification, regardless of accuracy, potentially compromising the security of the protocol. This would potentially be done as a way to "speed up" the pairing by users. Additionally, this protocol may not be feasible for use in larger than one-to-one simultaneous pairing scenarios. Finally, given the tracing requirement, this approach may be an AR-only system. Without the ability to see the actions of the pairing partner's hands, there is no way to validate that they are tracing the correct hologram.

Another approach removes some of the elaborate requirements for user interaction. This approach involves two co-located users, both wearing AR devices, "tapping" on the same physical location using a head-directed pointer to denote the selected location. This "tap" involves users directing their head at the generated hologram, whose location is the shared secret. This action gives a potential eavesdropping attacker an insight into the value that underlies the security of the protocol. For this reason, it is assumed that an attacker is not located with the legitimate users. Additionally, the assumed surface for placing the hologram does not contain windows, something that greatly limits usability in such spaces. This approach centers on the user's ability to see the physical space the pairing initiator has selected for them to "tap", potentially requiring the pairing initiator to move and adding additional time to the pairing process. This is something not easily done in fully VR environments.

In each of the existing approaches, users are required to be wearing an AR device (and only an AR device). All three existing systems require users to see each other or interact with the physical environment, limiting the system to AR applications. In various embodiments, user interaction is employed as well, but this communication is through voice, and is applicable to both AR and VR uses. These embodiments extend to more than two users, and use eye gaze for entropy generation, a technique that simply requires users to direct their eyes at a holographic target. Eye gaze requires very little movement from the users, is nearly invisible to bystanders due to the opaque visor on most AR devices, and is shown during evaluations to be easy to learn and understand.

In various embodiments, users are wearing AR HMDs with gaze tracking sensors. These AR HMDs have access to a local network but may or may not have access to the larger internet through this connection. The users may not be required to remove these AR HMDs to conduct any of the tasks for pairing their devices. Additionally, the users may be co-located, in such a proximity that a spoken word can be easily heard by all legitimate clients.

A threat model is next discussed. For example, a threat may have access to the local network that the legitimate users are using to conduct the pairing, and may monitor, intercept, and duplicate packets arbitrarily. The threat may also be physically located with the users. However, the attacker cannot do both simultaneously, such as intercepting packets on the local network while also being within earshot of the legitimate users. The threat may also have access to an AR device (e.g., a HOLOLENS 2), but does not need it to intercept the initial shared holograms.

Figure 1B:
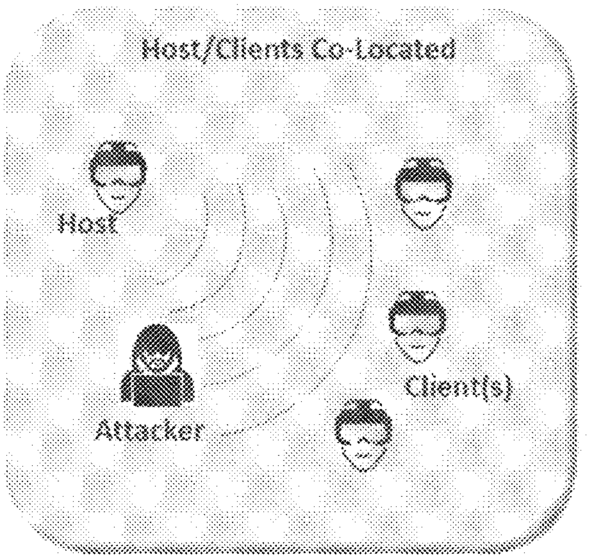

FIGS. 1A and 1B illustrate example attack strategies against the security of the pairing system. If the attacker has access to the local network, as illustrated in FIG. 1A, the attacker has the ability to intercept traffic at will and can understand the location of any holograms presented to each user. The attacker cannot, however, overhear or eavesdrop on any activity in the physical proximity of the users. If the attacker has access to the physical location of the pairing, as illustrated in FIG. 1B, the attacker has access to the vocal communication between the pairing partners, but not the network traffic being passed amongst the pairing partners. Here, the attacker may have knowledge of what is said or done among the pairing partners but does not have a way to use the passing network traffic to exploit this information.

Various embodiments are designed with five principles in mind: usability, success rate, scalability, security, and device requirements. With respect to usability, the user interface and required operations should be intuitive to novice AR device users. Pairing should not require use of any advanced interaction techniques to navigate the user interface. The completion of a pairing should not take an excessive amount of the user's time. With respect to success rate, the pairing should be effective, meaning that user pairing success rate must be 95% or higher. For scalability, the pairing should allow more than a one-to-one pairing, and should be able to complete these pairings without excessive additional time requirements. Since keys generated from this pairing are symmetric, embodiments of the pairing process should be able to efficiently generate multiple matching keys. Embodiments of the pairing process should produce an acceptable level of security through the level of entropy from the shared secret created by harnessing eye gaze. Embodiments of the pairing process should be resistant to MITM attacks. Embodiments of the pairing process should operate across the breadth of MR devices that incorporate eye gaze tracking, and allow hardware-independent, efficient pairing for each. Embodiments of the pairing process should be deployable on any such MR device quickly and with no software package conflicts, for example, by simply changing the intended deployment platform in UNITY.

Using eye gaze tracking for both user input and entropy generation involves inherent error. The underlying mechanisms to harness this gaze data once collected are non-trivial. Additionally, using eye gaze can limit the accessibility of the protocol if attention is not paid to users with less-than-perfect vision. Finally, the user's uniquely identifying eye and gaze tracking data should be protected. In the following, these challenges are discussed in detail.

To begin with, eye gaze tracking has inherent error. A roughly 1.5-to-3-degree variance in expected gaze location compared to the recorded gaze location has been observed. This error only increases when the user moves and dictates the minimum size of eye gaze targets with the user stationary or in motion. A hologram is generated and replicated to any and all clients, where the hologram was meant for a user to follow with their eyes for a given period of time. The resultant movement direction was discretized and became the shared secret. For example, 14 bits of entropy may be generated using this technique. This entropy, however, is limited by the fact that gaze tracking comes with error, and error may be removed through error correction and discretized input values with error thresholds that limited trajectory entropy.

In one example, the hologram itself is sent over the still-untrusted network. This potentially allows attackers to intercept the hologram's trajectory and replicate the shared secret. From this, it was determined that out-of-band (OOB) communication may be helpful.

Gaze data has not been studied for the pairing of AR devices in order to exchange information securely. To this point, gaze data has been identified as a rapidly increasing research area for securing Human-Computer Interaction (HCl), but mechanisms to create symmetric keys from eye gaze data have not been previously described. The embodiments herein can take a user's eye gaze, discretize as required, and use this secret information to create a symmetric encryption key. This system should be robust enough to ensure a reasonable amount of security without creating a burden to the user.

Any system harnessing eye gaze may acknowledge that not all users have perfect (or even good) vision. Such a system may be usable by users with glasses, contacts, or with imperfect vision when using any of the above. No system can claim to be accessible to all users, in this case such as ones with complete vision loss, but the system may address the needs of the greatest possible population of participants. The system may present an interface that is legible, intuitive, and does not strain the vision of users.

Eye gaze data can uniquely identify a user and has the potential to harm users if the collected data is misused. As such, techniques can remove the uniquely identifying traits from gaze data, if and when it needs to be transmitted in insecure environments. A system using eye gaze tracking may ensure that the uniquely identifying biometric data is not leaked or transmitted in such a way as to jeopardize the user's privacy.

The embodiments described herein overcome these challenges and create a usable, scalable, and efficient pairing system using eye gaze. For example, inherent eye tracking error is mitigated by constructing holograms to meet the design specifications and a discretization mechanism can be used to compensate for gaze tracking error. Further, the gaze data can be transformed into a shared secret, and a symmetric encryption key can be created to be used to protect further user communication across a local network. A spoken sequence cue may be used to direct the users to the correct numbered holographic keys and may be used as the OOB channel. Evaluation results suggest that various embodiments are viable for users with vision difficulty, and it does not transmit or jeopardize the user's gaze or eye data.

Figure 2:
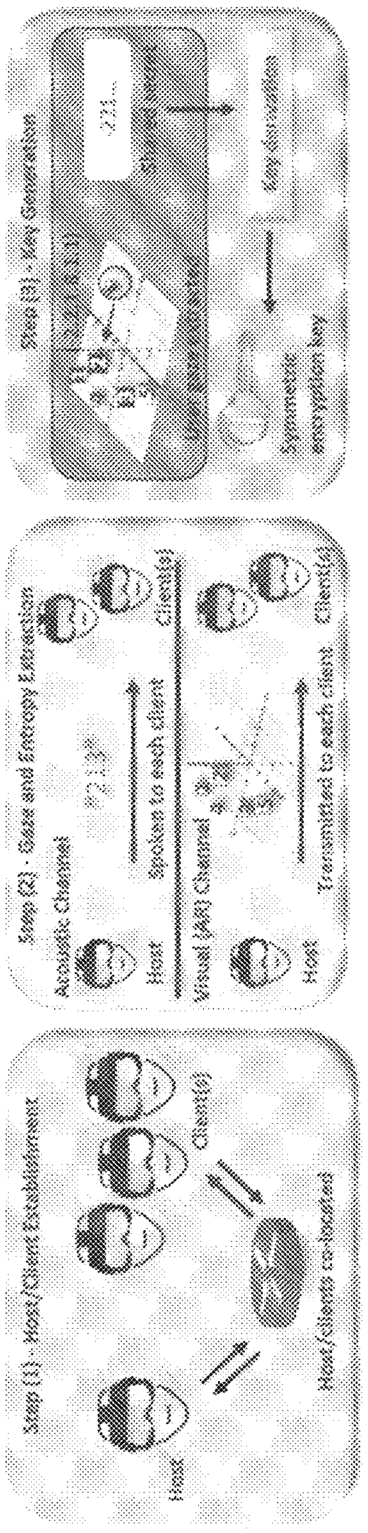
FIG. 2 illustrates three example steps to key generation and device pairing according to one or more embodiments.

FIG. 2 illustrates three steps to key generation and device pairing according to one or more embodiments. In order to create the symmetric encryption key required to complete pairing of the AR devices, the pairing method may operate in three main steps as shown in FIG. 2. First, the pairing method creates a host/client relationship on a local network, e.g., through a User Datagram Protocol (UDP) connection. This ensures that information (i.e., numerically labeled holograms) is accurately shared between two or more users. Next, the host randomly places, for example, ten numerically labeled holograms (denoting digits from 0 to 9) within a certain visibility threshold. The size of the keys is determined by the eye gaze tracking error based on pilot testing. Specifically, this size is a compromise between large keys limiting generated entropy and small keys limiting the accuracy of eye gaze. The host then speaks a key sequence cue (KSC) to each client. This process addresses the out-of-band communication challenge. In another example, the KSC can be written, if users have significant obstacles to speaking and/or hearing the KSC. Each client selects the required numbers in sequence, dictated by the KSC, one at a time using eye gaze. The shared secret becomes the concatenated, discretized values of the 3D location of the user's gaze when the user selects each numerically labeled hologram. This process harnesses the user's eye gaze to obtain the entropy needed for creating symmetric encryption keys, while not requiring storage of any data that can compromise user privacy. Finally, key generation uses the shared secret to create a symmetric encryption key, e.g., an Advanced Encryption Standard (AES) key. This key is a function of the shared secret created by the gaze tracking data. Hence, the entropy of this shared secret may be as large as possible to create strong keys.

Figure 3:
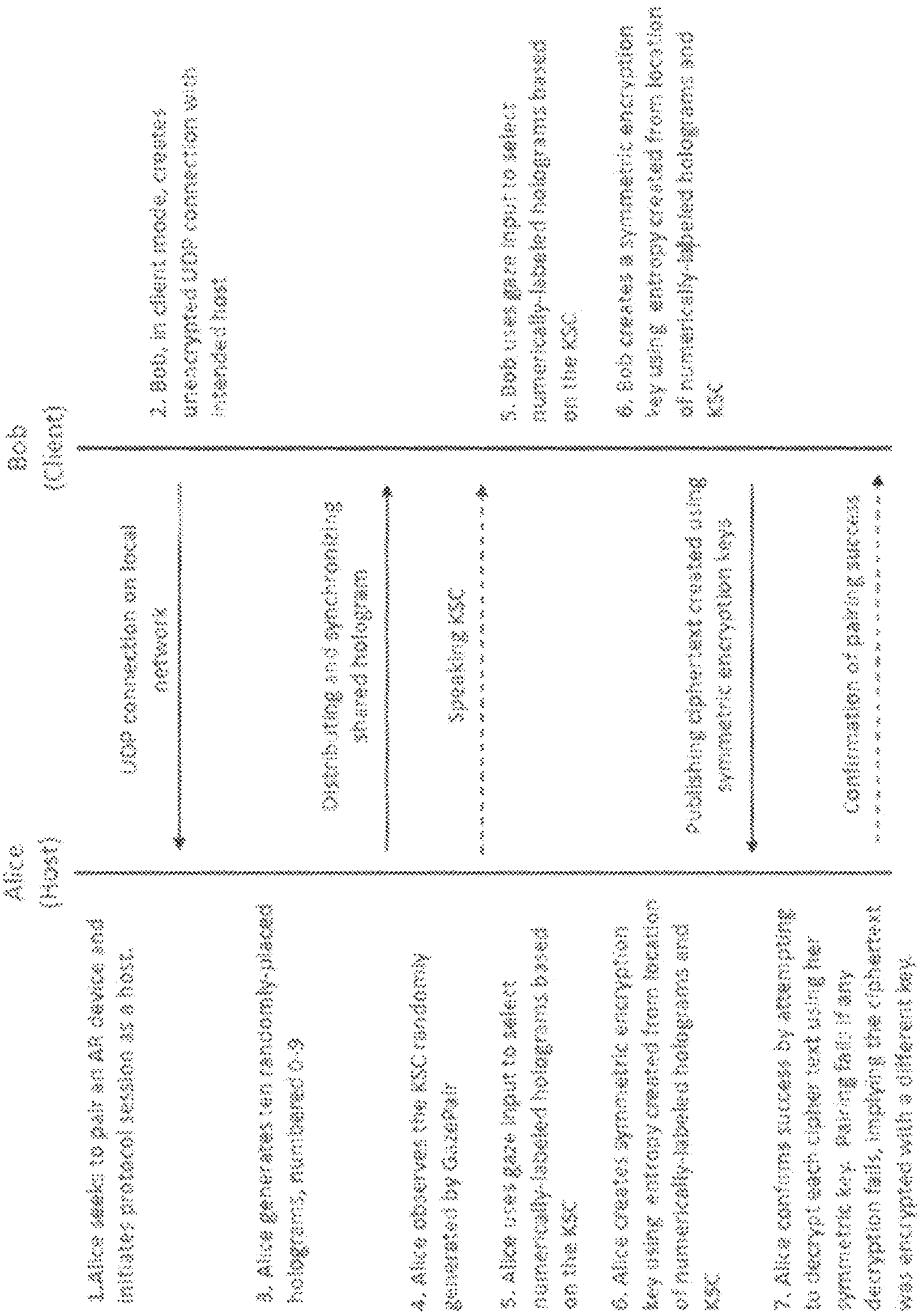
FIG. 3 depicts one example of the pairing protocol, using the classic Alice and Bob analogy, according to one or more embodiments.

FIG. 3 depicts one example of the pairing protocol, using the classic Alice and Bob analogy, according to one or more embodiments. While there is only a single client (Bob) in this illustration, the pairing protocol is scalable to multiple clients. As shown in FIG. 3, a pairing session begins with the host selecting their role in the initial connection scene (Step 1). This allows a client or clients to initiate the protocol appropriately, and establish an unencrypted UDP connection to the host (Step 2). With this connection established, the host randomly generates ten numerically labeled holograms, numbered 0-9 (Step 3). These numerically labeled holograms are randomly placed in the augmented 3D space, with limits. These limits are designed to ensure the holograms are within a given visibility threshold. These holograms may be placed relative to the position of each pairing participant and are not anchored to any one physical location.

The client then receives these locations and reproduces the set of numerically labeled holograms on the client's HMD. Then, the host observes the randomly generated KSC (Step 4) and communicates (e.g., by speaking) the KSC to the client. Each participant uses gaze input to select numerically labeled holograms in sequence based on the KSC (Step 5). If the gaze ray impact point is inside the discretization range of any hologram, that hologram turns red to indicate to the user the key has been successfully entered. The discretized values of the gaze position are then concatenated to generate the shared secret string independently on each HMD.

Consider the example in FIG. 2. Suppose the KSC is "213". For the first numerically labeled hologram selected (i.e., digit "2", the first digit of the KSC), a gaze location of (−2.2,1.8,1.1) is captured and might be corrected to the string "−221" based on discretization parameters, and this becomes the first three digits of the shared secret. This continues until the required KSC length is met, and the protocol waits for each participant to complete this process. After completing the entry, each HMD independently creates a symmetric encryption key (Step 6) and encrypts a message using this key. The pairing protocol succeeds if and only if the host can decrypt each client's ciphertext (Step 7).

The pairing protocol uses a KSC similar to a padlock combination or a keypad on a door. On the face of it, this sounds similar to a traditional passcode-based pairing instance and may seem insecure or trivial. However, the KSC is of no value to any attacker without detailed knowledge of the location of the numerically labeled holograms in 3D space. In fact, even given the threat model discussed above with respect to FIGS. 1A and 1B, an attacker who overhears or otherwise discovers the KSC can gain no value without also simultaneously intercepting the location of the numerically labeled holograms.

The pairing process can be modified to use other standard AR (or generally MR) gestures and inputs. For instance, using the "hand ray" gesture, creating a simple ray from a user's extended hand can be used to select the numerically labeled holograms in sequence based on the KSC. While it is possible to do this, this approach loses the benefit of the obscuration of the user's eyes. With the HOLOLENS 2, the user's eye direction is greatly obscured by the plastic visor upon which the holograms are projected. Without this, an attacker could more easily understand the location that the user is intending to select, aiding in deciding on the location and sequence of the numerically labeled holograms being detected.

Non-limiting examples of prototype implementation are next discussed. Using the UNITY development environment, MICROSOFT's Mixed Reality Toolkit (MRTK), and multiple HOLOLENS 2 AR HMDs, an implementation can be created that advances the state-of-the-art with proven usability and scalability. The pairing protocol creates 64 bits of total entropy in the shared secret while not exposing the user's uniquely identifying eye data to potential misuse. Additionally, the pairing protocol is usable by those with impaired vision and is deployable on any MR device capable of eye gaze tracking.

Created and maintained by MICROSOFT, the Mixed Reality Toolkit (MRTK), is an attempt to standardize the development of MR applications. MRTK is at the core of the HOLOLENS, and its successor, the HOLOLENS 2. Additionally, MRTK is used to design applications for META's OCULUS series of MR devices, as well as HTC's Vive, and other WINDOWS Mixed Reality headsets. MRTK also contains the APIs used to access the HoloLens 2's powerful eye tracking technology. In one example, the deployability of this prototype on MR devices depends on the device's use of MRTK for eye tracking, but the design itself is usable on any MR device incorporating eye gaze tracking. At this moment, only the HOLOLENS 2 incorporates eye tracking using MRTK, but as this expands, so does any pairing solution created with MRTK's eye tracking APIs, including any and all MR devices using this specific capability.

In order to distribute these numerically labeled holograms, a networking suite may be used to create and synchronize the holograms. In one example, a UNITY-developed API called Mid-level API (MLAPI) may be used to create this functionality. MLAPI is open source and simply seeks to abstract transport layer functionality to ease the integration of networking functionality into UNITY-created applications. MLAPI allows the user to easily declare their intent to initiate a session as a host or a client, and function accordingly. While MLAPI communicates to clients without encryption, the information shared publicly (i.e., location of numerically labeled holograms) is not sufficient to breach the security of the pairing process. After confirmation of matching symmetric Advanced Encryption Standard (AES) 256-bit keys, users can use these keys to encrypt any communication desired.

Figure 4A:
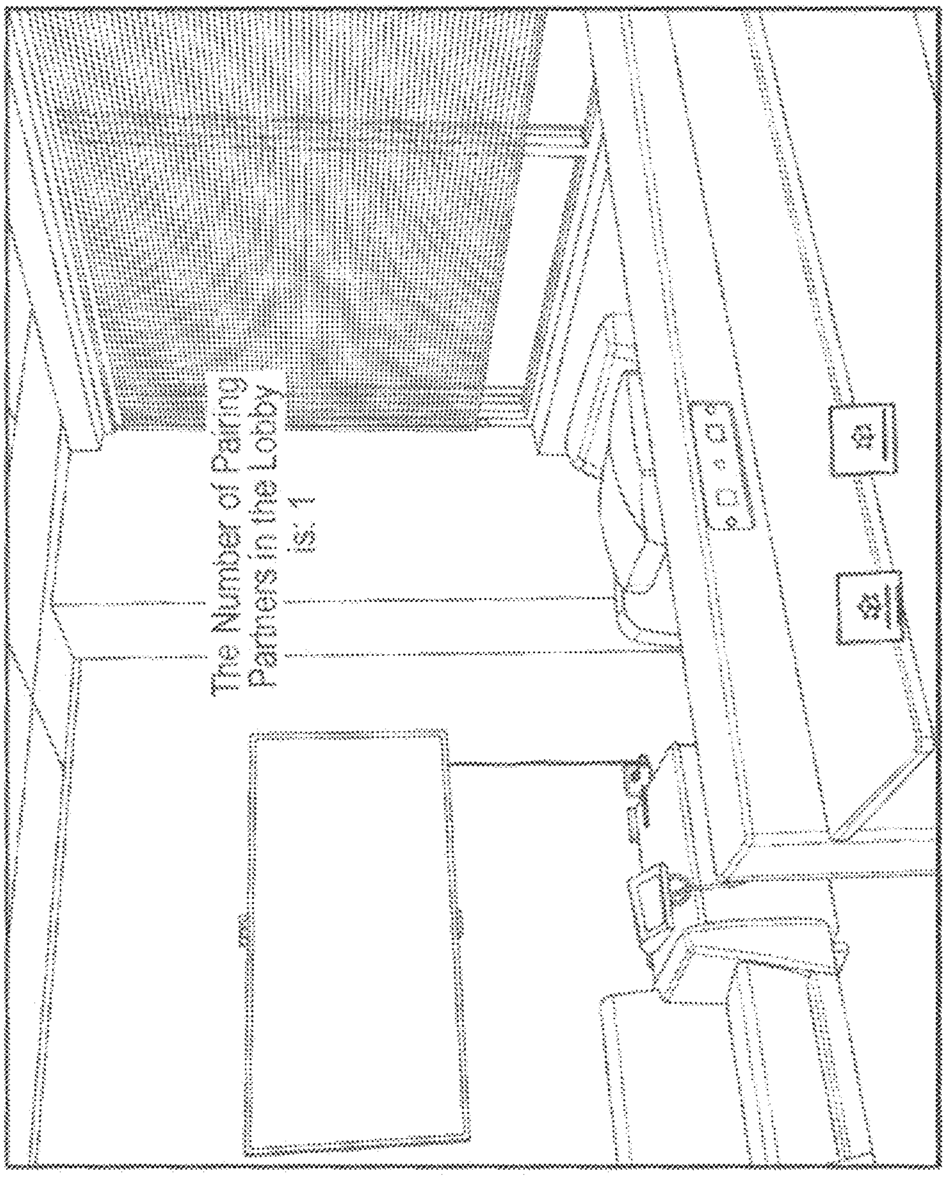
FIGS. 4A-4C correspond to an example illustration of Steps (1) and (2) of one implementation of the pairing process.
Figure 4B:
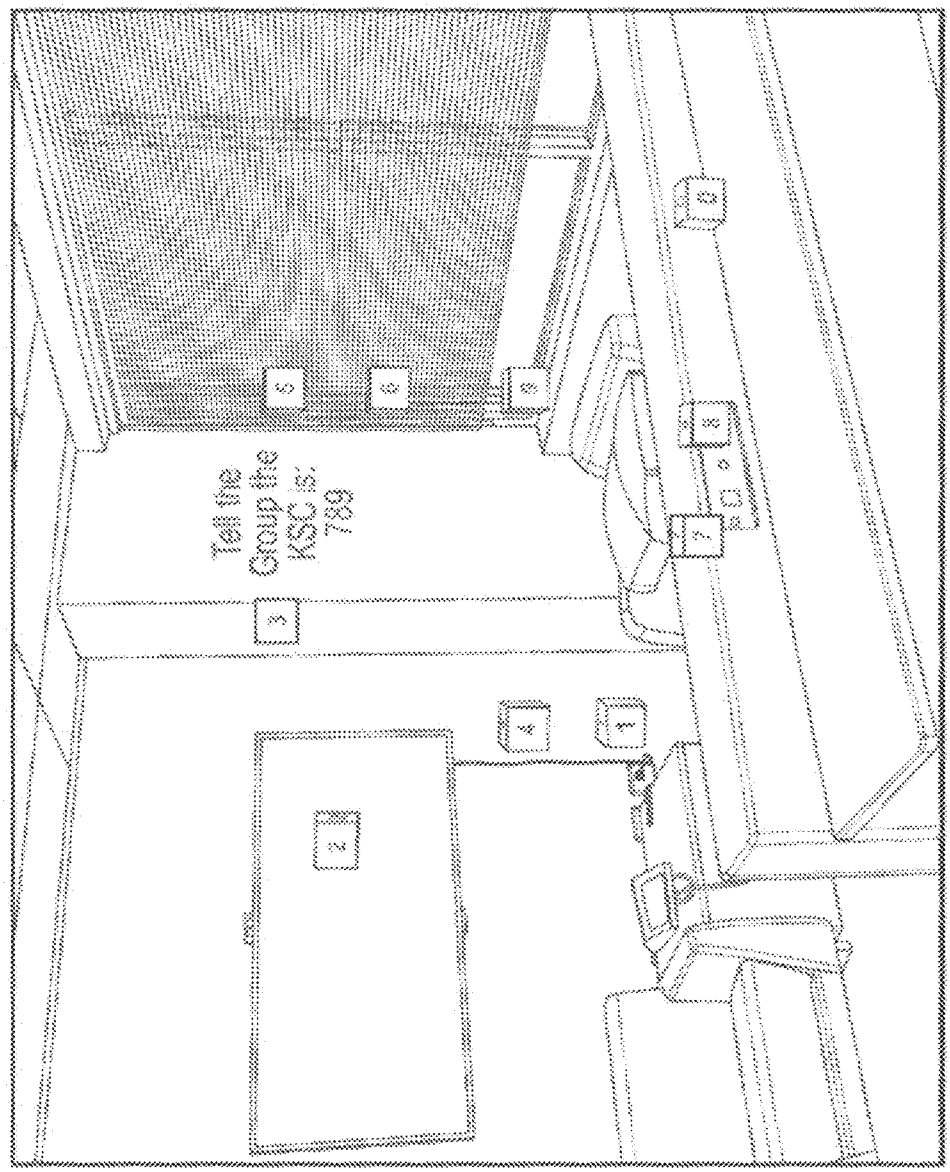
Figure 4C:
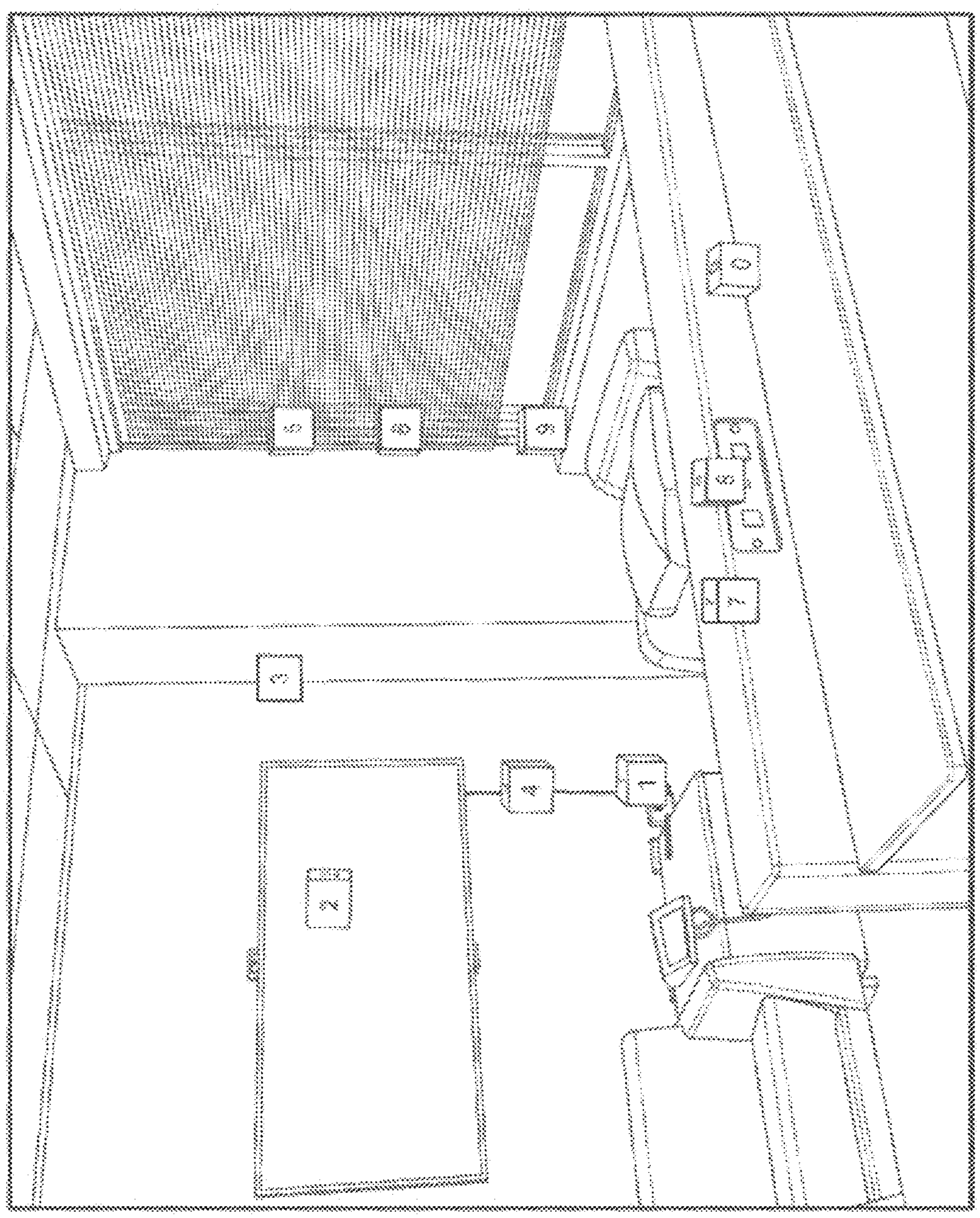

FIGS. 4A-4C correspond to an example illustration of Steps (1) and (2) of one implementation of the pairing process. FIG. 4A shows a first scene in which the host and client select their applicable roles and the pairing protocol establishes their relationships. FIGS. 4B and 4C show the view of the pairing scene from both the host's and client's point of view, respectively.

The pairing process may create the host/client relationship in one of two ways. First, the user can enter the local IP address of the desired host. This is a simple and effective way to complete the pairing but uses knowledge of the IP address in advance. Second, the pairing process may allow a user to create a host and may use User Datagram Protocol (UDP) broadcasts to advertise the IP of this pairing instance. A client then picks from a list of hosts for pairing. While the most user-friendly, many routers do not allow for UDP broadcasts, and this method also creates an environment for confusion and misidentified hosts if multiple pairing sessions are created on the same local network.

The host, and in one example only the host, is able to monitor the number of clients registered by the mid-level API (MLAPI) as present in the pairing lobby. This serves to ensure that the host has made a connection with the number of clients they expect and also serves to ensure that, if clients additional to the number expected join the pairing instance, the host is informed. This may not stop a surreptitious MITM-style attack but will mitigate the risk of a client accidentally joining the incorrect pairing instance by allowing the host visibility of how many clients are connected to their pairing session.

After creation of the host/client relationship between two or more HOLOLENS 2 devices, the host randomly distributes ten numerically labeled holograms (denoting digits from 0 to 9) within a given visibility threshold. These numerically labeled holograms may be placed no closer to each other than twice the distance of a given error threshold in any direction. In some implementations, these numerically labeled holograms are created in user-friendly locations, and not on top of users, behind users, or too far from users. An example of this from the host's and the client's viewpoint is shown in FIGS. 4B and 4C, respectively. The host then speaks a randomly generated KSC of a given length. Each user, independently, selects the numbers in sequence, specified by the KSC, one at a time using eye gaze. The selection may be done using MRTK's GazeProvider APIs to access a gaze ray, from the user's eyes to the hologram, striking at a given point. Once the user's gaze is placed on the intended hologram, the user takes a snapshot of the current gaze location by using the "air tap" gesture.

Figure 5:
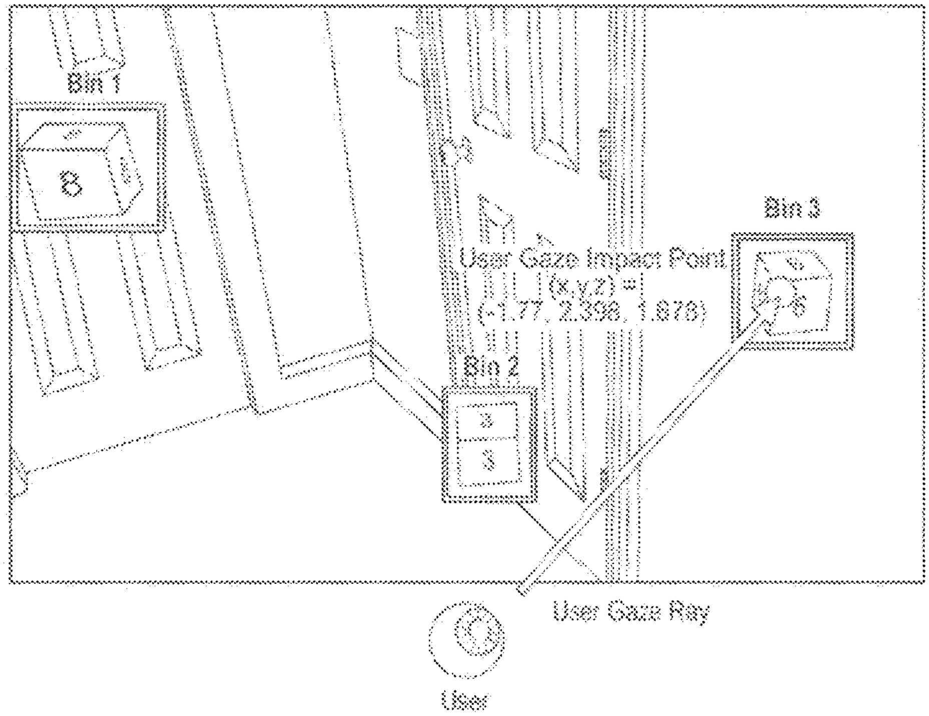
FIG. 5 shows one example of the eye gaze discretization technique according to one or more embodiments.

FIG. 5 shows one example of the eye gaze discretization technique according to one or more embodiments. After a KSC is spoken to each client from the host, each user finds the required numerically labeled hologram, gazes at it, signals the protocol to take a snapshot of the gaze location, and moves onto the next required hologram. Each gaze sampling is discretized and becomes a part of the shared secret. In this example, the first gaze sampling is taken when the user gazes at the hologram labeled "6". The raw gaze value is (−1.770, 2.398, 1.678), which is then discretized to "−222", based on the discretization parameters, and added to the shared secret. The length of this value will increase as the user takes more gaze samplings directed by the KSC.

The user's gaze location is discretized to allow for effective shared secret generation and error correction, as shown in FIG. 5. Given an error threshold, one or more embodiments create a grid of 3D spaces covering all possible hologram locations. Since the host generates the shared holograms at specific locations at the center of these "error cubes", and given the error threshold, it is not possible for a user to select a given hologram and produce the discretized location of another. This allows the pairing method to ensure discretization within a given threshold without having to publicly exchange discretization parameters. Each discretized value becomes a part of the shared secret, and each value may be concatenated to become the final string used as the input to the Password-Based Key Derivation Function v2 (PBKDF2) for symmetric key generation. If the users enter an incorrect key, the shared secrets and symmetric keys will not match, and the pairing will fail. This shared secret, once successfully generated, is kept local to each device and is not shared across the local network.

The "air tap" gesture is used jointly with the user's gaze location to harness gaze data. This gesture involves the user "pinching" in the air to signal the device to select an eye gaze target for action. This gesture does not require the user to direct this "tap" at any given hologram, only that the gesture is visible to the HOLOLENS 2's Articulated Hand Tracking (AHAT) short-throw camera, which has a field of vision several feet outside what the user can see through the HOLOLENS 2's visor. Once the HOLOLENS 2 identifies the user's hand has completed this gesture, it signals the HOLOLENS 2 to begin a process of collecting the current user gaze data by taking a snapshot of the gaze position as it intersects with the numerically labeled hologram. The resulting gaze location is then discretized and used as part of the shared secret.

Another example involves a gesture-less method of gaze collection. This method asks a user to simply keep their gaze on an intended hologram, and after an elapsed period (e.g., two seconds), the pairing system records the gaze position and discretizes this portion of the shared secret. This method is also effective, but vulnerable to novice AR users staring too long at a given hologram while they are learning the pairing system.

During the pairing process, users are allowed and encouraged to move freely around the room. There is no requirement to sit, or stand, or to remain stationary. In fact, some users find it more entertaining to alter the way they view the numerically labeled holograms, while some prefer to sit. Either is acceptable and does not alter the pairing system's efficiency or effectiveness.

After establishment of the shared secret, each instance creates a 256-bit AES key using the shared secret as an entropy source. One technique to generate symmetric keys from passwords or other shared secrets is Password-based Key Derivation Function v2.1 (PBKDF2). While known vulnerabilities exist in this method of key generation, including vulnerability to rainbow table attacks using advanced Graphics Processing Units (GPUs), the pairing system has potential pairing partners commit to a single symmetric key during the pairing process, using unique and random initialization vectors and salt values, mitigating the problem of offline rainbow table attacks.

PBKDF2 seeks to protect a relatively low-entropy secret used to create keys, namely a password or other shared secret. To do this, PBKDF2 hashes a password input with an initialization vector, and adds artificial computational work to make a rainbow table or dictionary attack more difficult. This computational work is intended to increase the computational cost of hashing all possible passwords a user might input. If the attacker knows the initialization vector, the attacker must then begin the computationally expensive process of generating all possible values of the password, and wait the time required for the artificial computational work defined by the number of iterations. In one example, the pairing system uses the SHA256 hashing function for PBKDF2 due to its collision resistance and high security, and a total of 50,000 iterations. 50,000 iterations is selected in this non-limiting example as it is a number that creates no noticeable performance degradation on the HOLOLENS 2, while larger values create noticeable and unacceptable degradation.

Both a salt and initialization vector are used for PBKDF2 key generation and AES encryption and decryption. Using a pseudo-random number generator, the host generates a 64-bit random number used as the salt and initialization vector. These values are published to all clients, ensuring that the salt and initialization vector are both random and known to all.

Using the accepted method of calculating password entropy, denoted by E, from the total number of shared secret possibilities, denoted by S, specifically entropy is as follows:

$$E=\log_2 S. \tag{1}$$

Assume a total number of K numerically labeled holograms. Each hologram has an (x,y,z) value on the 3D Cartesian plane, and these values are limited to the value pool, i.e., the total possible values of each axis, denoted by $X_t$, $Y_t$, and $Z_t$. Each (x,y,z) value is non-repeating for each combination, to prevent two numerically labeled holograms from spawning in the same location. We use the permutation below to solve for the total number of possible key arrangements of the total K numerically labeled holograms, denoted by $N_K$:

$$N_K=\binom{X_t\cdot Y_t\cdot Z_t}{K}\cdot K!=\frac{(X_t\cdot Y_t\cdot Z_t)!}{(X_t\cdot Y_t\cdot Z_t-K)!} \tag{2}$$

The numerically labeled holograms selected are dictated by the order and value of the KSC, which is generated by the pairing system and given by the host. The number of numerically labeled holograms selected is the length of the KSC, denoted by P. Since the KSC has non-repeating digits (to aid in input and error detection), the total number of KSCs, denoted by $N_p$, can be calculated as follows:

$$N_P=\binom{K}{P}\cdot P!=\frac{K!}{(K-P)!}. \tag{3}$$

Hence, the total number of shared secret possibilities is $S=N_K\cdot N_P$. Plugging it into equation (1), we calculate entropy E as follows:

$$E=\log_2 S=\log_2(N_K\cdot N_P). \tag{4}$$

In one or more embodiments, entropy is calculated slightly differently, as all the numerically labeled holograms are on the same Z-axis to ensure visibility, and thus, there are fewer permutations. A KSC length of three digits is used.

Additionally, in various examples numerically labeled holograms are not spawned at (0,0) on the (x,y) planes, so as to not obscure the host's view of the KSC prompt. For example, $X_t$=7, $Y_t$=6, and $Z_t$=5 may be used. One example has a total of ten numerically labeled holograms, 0-9, so K=10. P=3, as the KSC has three digits, which are non-repeating. Hence, the following is calculated:

$$N_K = \binom{X_t \cdot Y_t - 1}{K} \cdot Z_t \cdot K! = \frac{(X_t \cdot Y_t - 1)!}{(X_t \cdot Y_t - 1 - K)!} \cdot Z_t = \frac{(7 \cdot 6 - 1)!}{(7 \cdot 6 - 1 - 10)!} \cdot 5 = 2.034 \times 10^{16} \tag{5}$$

$$N_P = \frac{K!}{(K-P)!} = \frac{10!}{(10-3)!} = 720 \text{ (approximately 9 bits of entropy)}, \tag{6}$$

$$E = \log_2(N_K \cdot N_P) \approx 64 \text{ bits.} \tag{7}$$

Embodiments of the pairing system may be capable, with the change of a single variable P, of using, for example, 10-digit KSC. This would create 3.6 million KSC combinations or nearly 10 bits of entropy in the KSC alone and increase the total entropy to nearly 76 bits. However, a 10-digit KSC would likely make the system more user-intensive and time-consuming. The length of the KSC may be limited to ensure ease of use. A 3-digit KSC is a compromise between security and usability.

In an experimental evaluation of one implementation, one-to-one pairing tests take an average of 9.02 seconds, with a 98.3% pairing success rate. One-to-two pairing tests take an average of 12.58 seconds, with a 96.6% success rate. The system as a whole receives a SUS usability score of 80, a score deemed "excellent". This is accomplished using a prototype that is deployable on the breadth of AR devices that use eye gaze tracking and the MRTK, and with a design that is deployable on the breadth of MR devices using any form of gaze tracking.

An example implementation was built in Unity 2020.3.16f1, using MRTK version 2.7.2 and MLAPI version 0.1.0. The implementation was deployed on MICROSOFT HOLOLENS 2 HMDs running WINDOWS Holographic for Business Build 20348.1438. BLENDER version 3.0.1 was used to create the custom numerically labeled holograms, and all source code was completed in C#.

The example implementation was tested by twenty participants with varying ages, vision capabilities, and technical backgrounds. Each user was then given a brief (ten minute) tutorial on the basic operation of the HOLOLENS 2, including adjustment of the fit of the HOLOLENS 2 HMD, accessing the main menu, AR gestures, and operating the pairing system. Additionally, each user was asked to complete an eye calibration before every set of tests. The participants were allowed to remain stationary during the tests, or move freely, as they felt comfortable. For each group of participants, a host was randomly selected and given the HOLOLENS 2 with the hard-coded internet protocol address for the host, while the other participants served as the client. Immediately following the testing, each participant was administered a System Usability Scale (SUS) questionnaire used to qualitatively evaluate the perceptions of the system's usability. All tests were conducted over a NETGEAR AC1750 router without an internet gateway to ensure that all tests were over a local network.

Three metrics were measured for each test iteration: the total time required to complete pairing, the success rate, and the number of pairing partners. A logging script begins a timer when the host is satisfied with the number of participants in the pairing lobby and begins the pairing protocol. From that moment, the elapsed time is measured until the completion of the KSC entry of the final participant to finish the sequence. The Boolean value that corresponds to the host's ability to decrypt messages from all clients in the pairing protocol is recorded. To create these messages, the clients encrypt a string using their independently generated AES keys created during the pairing process. If any message cannot be decrypted by the host, the pairing protocol is considered a failure, and the host is notified. The logging script records, for each test, how many participants were present for the pairing session.

Figure 6:
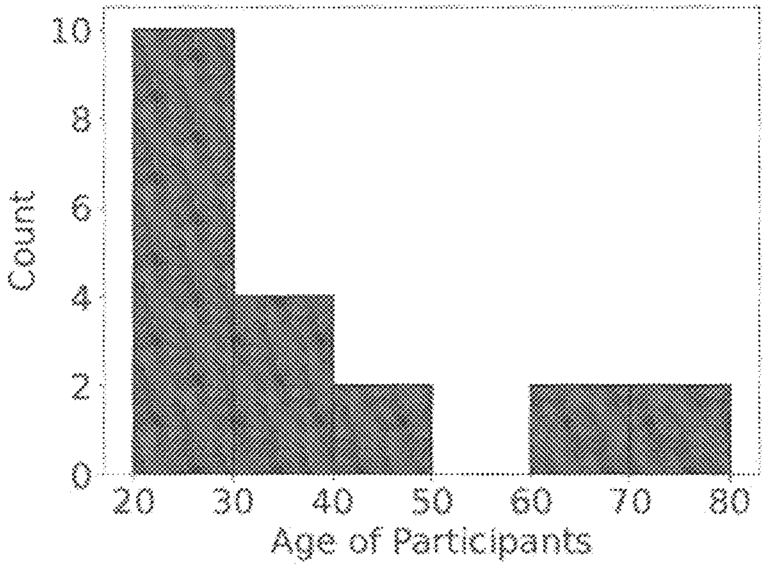
FIG. 6 is a histogram of the ages of the twenty testing participants in a tested example.

FIG. 6 is a histogram of the ages of the twenty testing participants in the tested example. Ages range from 20 to 72, showing that the prototype is usable by a wide variety of ages. Our testing consists of 6 self-described women and 14 self-described men, only four of whom self-profess any experience with AR devices. Users have a wide variety of vision capabilities, ranging from perfect vision without glasses or contacts, to impaired with vision correction. Users come from backgrounds that vary from computer science graduate students, military service members, to retirees.

The pairing system's effectiveness is evaluated by analyzing the number of successful tests against the total tests, and the reasons for each failed test. This is done for both one-to-one and one-to-two pairing attempts. The time required to complete a pairing iteration is evaluated in order to establish evidence of its efficiency. One-to-one and one-to-two pairing attempts are distinguished. Additionally, the System Usability Scale (SUS) is used to quantify how usable the testing participants found the pairing system. Usability is expected to increase as users increase their familiarization with the system. Pairing times are presented, compared against the number of pairing attempts completed, as a way to analyze this.

With 240 tests, 97.5% of pairings complete successfully. The six tests that failed were due to mis-selected numerically labeled holograms, either selected in the incorrect order or due to misunderstanding the KSC. For one-to-one pairing attempts, 118 of 120 (98.3%) are successful, while 96.6% of the 120 one-to-two pairing attempts succeed. The one-to-one pairing performance is an 8% improvement on the most current and advanced AR device pairing technique, while the 96.6% pairing success rate of the one-to-two tests shows the pairing system's scalability.

Figure 7:
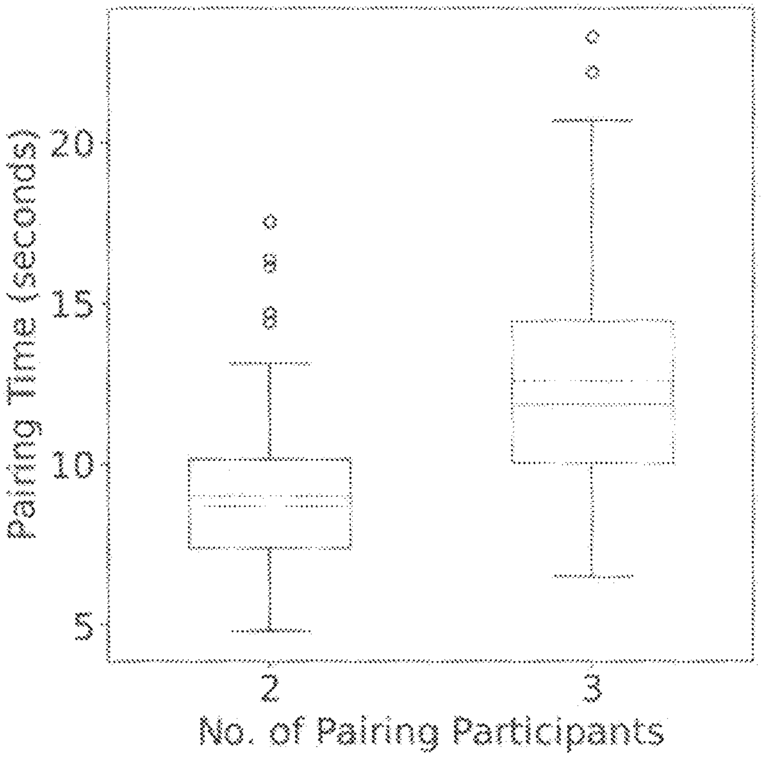
FIG. 7 is a boxplot of the total pairing time, by the number of pairing partners, in the tested example.

FIG. 7 is a boxplot of the total pairing time, by the number of pairing partners, in the tested example. The median time is shown with the solid horizontal line. For one-to-one pairing, the median time is 8.7 seconds; for one-to-two pairing, the median time is 11.83 seconds. The average time for each is represented by the dashed horizontal line. The average time to complete one-to-one pairings is 9.02 seconds, from the host initiating the pairing protocol, to the host's successful decryption of each client's ciphertext using the host's AES key. For one-to-two pairings, the average pairing time increases to 12.58 seconds. This shows the efficiency of the pairing system, as measured by user time requirements. The pairing system matches or improves on the pairing time of known local AR pairing solutions. Additionally, the pairing system receives an SUS score of 80, which is deemed "excellent" in the scoring scale. This is a reflection of the post-test user impressions of the usability of the system.

The "Air Tap" technique appears to be sensitive to the calibration of the eye gaze sensor. In another example, a gesture-less version of the pairing system uses gaze dwell as the trigger to collect the gaze data. This technique is potentially even more user-friendly, but the likelihood of novice AR users accidentally selecting the incorrect holograms while learning AR gestures increases.

Figure 8A:
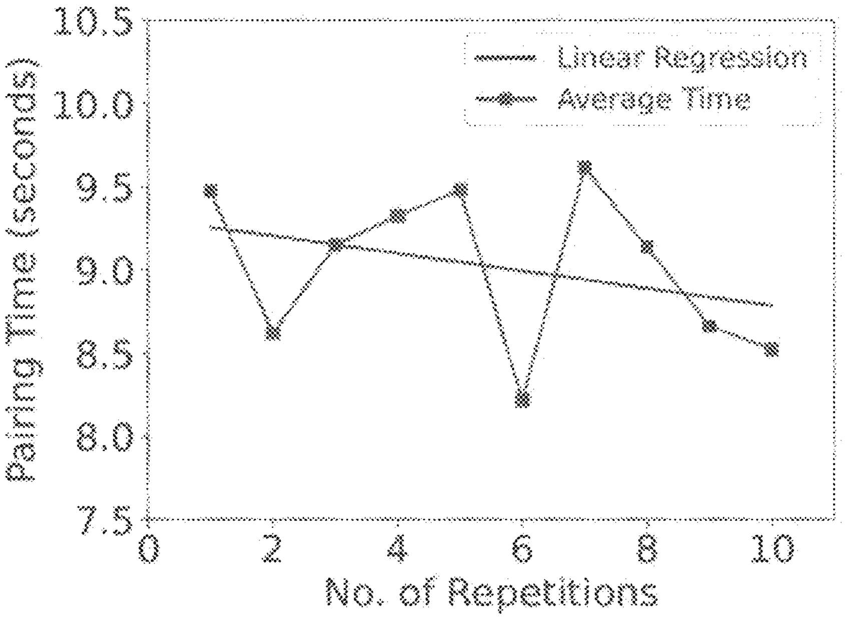
FIGS. 8A and 8B are charts illustrating the effect of multiple repetitions on the pairing time shown by average time and a linear regression of the time required for sequential tests in the tested example.
Figure 8B:
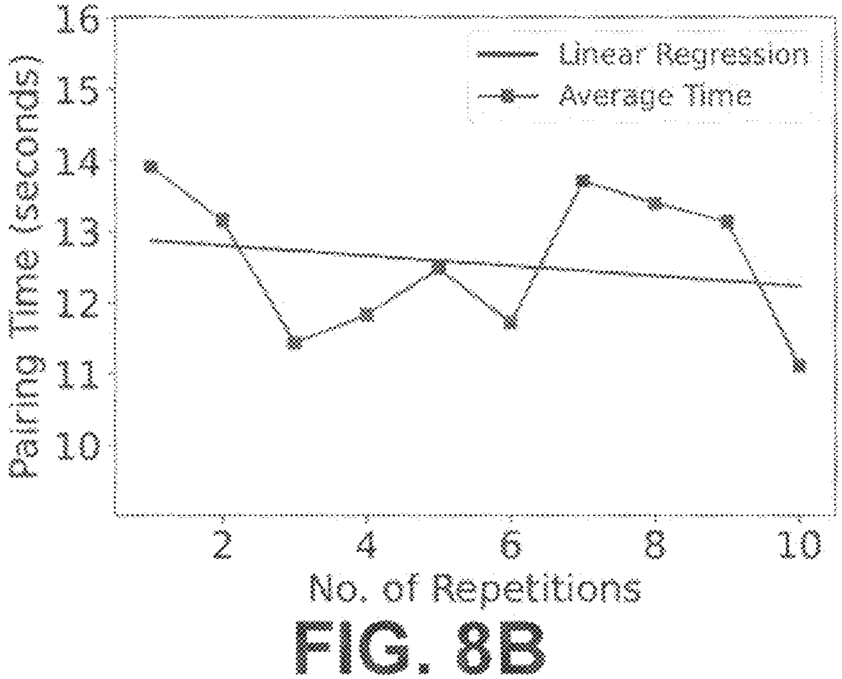

FIGS. 8A and 8B illustrate the effect of multiple repetitions on the pairing time shown by average time and a linear regression of the time required for sequential tests in the tested example. FIG. 8A shows the results of ten tests with two participants in one-to-one pairing. FIG. 8B shows the results of five tests with three participants in one-to-two pairing. The generally downward trend of the pairing time, as the familiarity with the system increases, shows the effect of experience with the system. As the participants spend more time with the pairing system, their familiarity with AR increases, and they are able to more easily complete pairing attempts. Specifically, the average pairing time for the first attempt at a one-to-one pairing is 9.47 seconds, falling to 8.52 seconds by the tenth. Similarly, the average first attempt with three participants in a one-to-two pairing is 13.9 seconds, falling to 11.09 seconds by the last attempt. Given the relative inexperience using AR of the participants, this appears to be expected. Additionally, this speaks to the usefulness of eye gaze. Users, regardless of AR experience, intuitively understand how to gaze at an object. No testing participant expressed confusion over the use of eye gaze. As mentioned above, while using the "air tap" involved some error when eye gaze calibrations were incorrect, it remains proven as an effective method for harnessing eye gaze.

Figure 9:
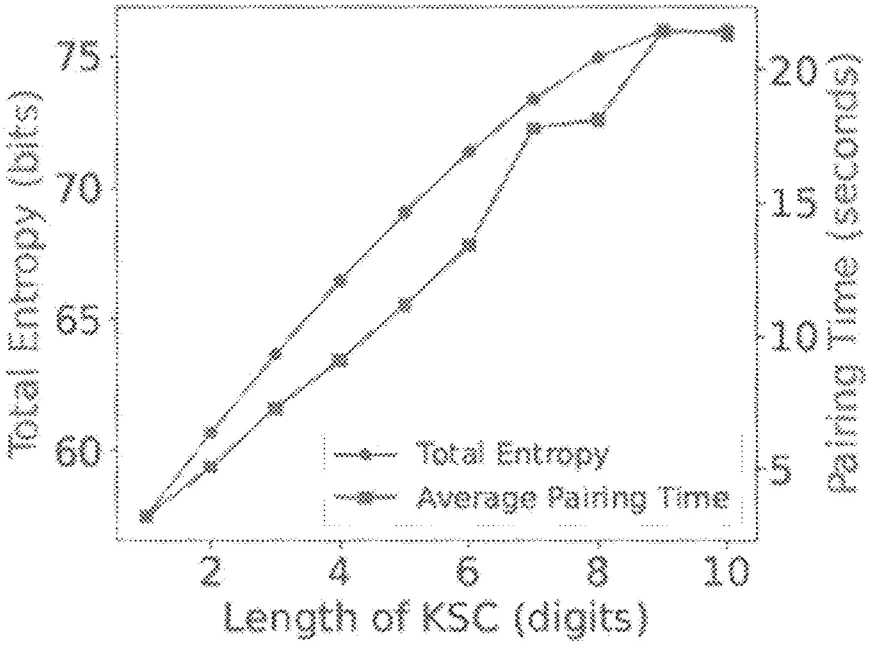
FIG. 9 is a chart showing the tradeoff between the increased entropy of a longer KSC and the additional time required to complete a pairing.

FIG. 9 shows the tradeoff between the increased entropy of a longer KSC and the additional time required to complete a pairing. This data was collected by two specific participants, testing the pairing system five times at each of ten KSC lengths. As is made clear by FIG. 9, increased entropy requires more time to pair. Additionally, the longer the KSC, the greater the task of communicating it to the clients, increasing the likelihood of error. A KSC length of three digits is used in an example implementation, creating nine bits of entropy in the KSC alone and 64 bits of entropy in total. This decision is a compromise between generated entropy and usability. However, if a user decides the increased time requirement is justified by the increased security of the larger entropy, various implementations can allow this.

The advent of the Metaverse is a motivational factor behind the expansion of AR. Large corporations envision this digital collaboration space as the future of work and entertainment. Certainly, the Metaverse could affect our daily lives in the near future. However, these large environments are envisioned to be hosted and implemented on centralized servers, likely under the control of large corporations. Data collected can include visual and audio recordings of the user, iris data, body type, and movement style. Groups could use ad-hoc, local, secure pairing techniques such as that described herein to transfer spatial data, visual and audio data, and the like while not having to worry about corporate data collection or misuse.

To clarify performance under attack, the ability of an attacker to compromise the security offered by the pairing system in each of the proposed threat conditions. If the attacker has access to the pairing system's network traffic, they can use this information to deduce the location of each numerically labeled hologram and the IV/Salt values. This is the most advantageous attack vector as the only barrier to compromise of the symmetric encryption keys is the knowledge of the KSC. Given a KSC length of 3, the attacker has a 0.1% chance to correctly guess the KSC, or a total of 9 bits of overall entropy. This chance is as low as 0.00003% with a KSC length of 10.

In the second threat condition, where the attacker is co-located with the pairing participants but does not have access to the pairing system's network traffic, the challenge for the attacker increases. For example, the pairing system randomly generates all ten numerically labeled holograms in three dimensions. First, the pairing system chooses a randomly selected z value (i.e., depth) from five possible choices. Then, all ten numerically labeled holograms are randomly generated on a 7×6 grid at this depth. Assuming a KSC length of 3, the attacker would need to guess from 344,400 possible combinations of holograms. Even assuming this correct guess, the attacker does not know the IV/Salt values shared between devices, making the knowledge of the shared secret irrelevant.

Even hearing the KSC without knowledge of the Salt/IV or placement of the numerically labeled holographic cubes does not give the attacker an advantage in this design. However, not all users may understand these technical details, and the act of speaking the KSC could indeed generate a perception of an insecure system, especially when the KSC is exchanged in public places. The potential misunderstanding about the safety of the system in the presence of other people/listeners could be alleviated with additional information about the high-level technical details. For example, if the users understand that the KSC cannot be used to compromise their pairing session unless the person overhearing their spoken communication can also intercept the Salt/IV and location of the individual holograms in 3D space, they may be much less concerned about this technique.

Various embodiments improve upon entropy and out-of-band communication limitations with spatial anchors. Spatial anchors can allow multiple devices to not only see shared holograms, but to see them in nearly the exact same location in the physical world. Even so, transferring spatial anchors involves significant overhead. Spatial anchors can be very large, and transferring them locally can be difficult. However, these anchors can allow users to interact with shared holograms at absolute locations, creating opportunity to use this for new and more intuitive methods to pair devices without using a KSC. Specifically, these anchors can potentially allow users to physically locate the intended pairing partners in a room, but without a wireless localization requirement. This enables new ways to authenticate users by verifying their physical location.

The pairing system disclosed herein leverages eye gaze tracking, a new and powerful AR technology. The pairing system achieves efficient, secure, and scalable local AR device pairing with minimal user interaction while protecting user gaze data. This requirement has become increasingly self-evident as the prevalence of AR devices increases, and the need to share holographic information locally becomes more pressing. A prototype system was implemented that allows two or more users, without an internet connection, to locally pair AR devices quickly and intuitively. Through experimental evaluation, pairing two or more AR devices using entropy created from gaze tracking can be efficient. Remarkably, users with minimal AR experience were able to efficiently and effectively pair two or more AR devices, achieving both a high success rate and a low pairing time. Additionally, the prototype system achieves an "excellent" usability score, with users that are generally unfamiliar with AR, and even with an average participant age of 37 years old. Furthermore, all of these can also be done without using techniques that limit the deployability of the pairing system to a small subset of MR devices or jeopardizing user biometric data.

With the advent of the Metaverse and future potential applications, such as in the military, healthcare, education, entertainment, and automotive manufacturing, the ubiquity of MR devices is only likely to increase. Techniques like the pairing system are the building blocks to enable easy and efficient adoption of these MR devices by the broadest range of potential users in the broadest range of emerging MR applications.

Figure 10:
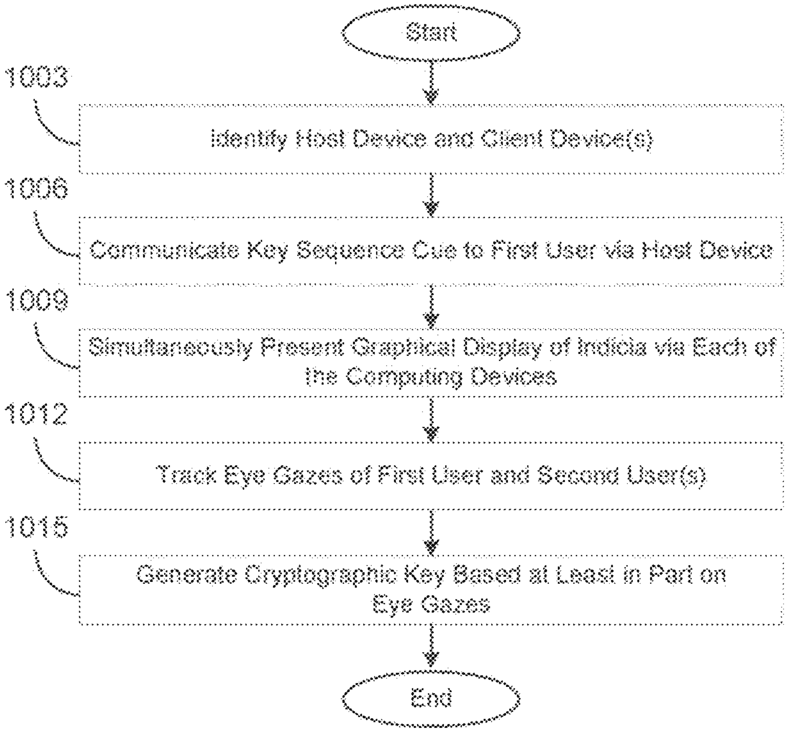
FIG. 10 is a flowchart illustrating one example of functionality implemented as portions of a mixed-reality device pairing system according to various embodiments of the present disclosure.

Referring next to FIG. 10, shown is a flowchart that provides one example of the operation of a portion of a mixed-reality device pairing system according to various embodiments. It is understood that the flowchart of FIG. 10 provides merely an example of the many different types of functional arrangements that may be employed to implement the operation of the portion of the mixed-reality device pairing system as described herein. As an alternative, the flowchart of FIG. 10 may be viewed as depicting an example of elements of a computer-implemented method according to one or more embodiments.

Beginning with box 1003, a host device and one or more client devices are identified from a plurality of computing devices. In box 1006, a key sequence cue is communicated to a first user via the host device. In some cases, the mixed-reality device pairing system may instruct the first user to communicate the key sequence cue verbally to the second user. In box 1009, a graphical display is simultaneously presented via each of the plurality of computing devices with a plurality of indicia distributed across the graphical display. For example, each indicium may correspond to a different hologram associated with a corresponding symbol. The indicia may be randomly distributed across the graphical display in some embodiments. The graphical display may be presented via respective head-mounted display devices. Data encoding the indicia may be generated by the host device and then sent to the client device(s).

In box 1012, eye gazes of the first user and one or more second users are tracked using a respective gaze tracking sensor of the plurality of computing devices. The eye gaze traces a sequence of a subset of the plurality of indicia corresponding to the key sequence cue. In one embodiment, the eye gazes may be discretized according to a grid of three-dimensional spaces corresponding to potential locations of the indicia. In one example, the eye gaze may be tracked using a respective air tap gesture at each indicium or a respective eye gaze dwell time at each indicium.

In box 1015, a cryptographic key is generated based at least in part on the eye gazes of the first user and the second users. For example, a respective symmetric encryption key may be generated in each of the computing devices based at least in part on the eye gaze of a respective user and the sequence of the subset of the plurality of indicia corresponding to the key sequence cue. A respective ciphertext may be sent from the client device to the host device, where the ciphertext is encrypted using the respective symmetric encryption key. The host device may then verify whether the ciphertext is decryptable using the respective symmetric encryption key generated by the host device. If so, the host device may pair with the client device in response. Thereafter, the operation of the portion of the mixed-reality device pairing system ends.

The embodiments can be embodied or implemented in hardware, software, or a combination of hardware and software. If implemented in hardware, the embodiments can include at least one processing circuit, with at least one storage or memory device. The at least one processing circuit can include, for example, one or more processors and one or more storage or memory devices coupled to a local interface. The local interface can include, for example, a data bus with an accompanying address/control bus or any other suitable bus structure. The storage or memory device can store data or components that are executable by the processors of the processing circuit.

In another example, if implemented in hardware, the embodiments can include a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, and/or programmable logic devices (e.g., field-programmable gate arrays (FPGAs), and complex programmable logic devices (CPLDs)).

The flowchart of FIG. 10 shows the functionality and operation of an implementation of portions of a mixed-reality device pairing system. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. Further, in some embodiments, one or more of the blocks shown in FIG. 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include physical media, such as, magnetic, optical, semiconductor, and/or other suitable media. Examples of suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The invention claimed is:

1. A computer-implemented method for pairing a plurality of computing devices, the method comprising:

identifying a host device and at least one client device from the plurality of computing devices;

communicating a key sequence cue to a first user via the host device;

simultaneously presenting a graphical display via each of the plurality of computing devices with a plurality of indicia distributed across the graphical display;

tracking an eye gaze of the first user and at least one second user using a respective gaze tracking sensor of the plurality of computing devices, the eye gaze tracing a sequence of a subset of the plurality of indicia corresponding to the key sequence cue; and generating a cryptographic key based at least in part on the eye gaze of the first user and the at least one second user.

2. The computer-implemented method of claim 1, wherein each indicium of the plurality of indicium corresponds to a different hologram associated with a corresponding symbol.

3. The computer-implemented method of claim 1, further comprising instructing the first user to communicate the key sequence cue verbally to the at least one second user.

4. The computer-implemented method of claim 1, wherein the graphical display is presented to the first user and the at least one second user via respective head-mounted display devices.

5. The computer-implemented method of claim 1, further comprising:

generating data encoding the plurality of indicia by the host device; and sending the data encoding the plurality of indicia to the at least one client device.

6. The computer-implemented method of claim 1, wherein generating the cryptographic key further comprises generating a respective symmetric encryption key in each of the plurality of computing devices based at least in part on the eye gaze of a respective user and the sequence of the subset of the plurality of indicia corresponding to the key sequence cue.

7. The computer-implemented method of claim 6, further comprising:

sending a respective ciphertext from the at least one client device to the host device, the respective ciphertext being encrypted using the respective symmetric encryption key generated in the at least one client device;

verifying, by the host device, whether the respective ciphertext is decryptable using the respective symmetric encryption key generated by the host device; and pairing, by the host device, the at least one client device in response to determining that the respective ciphertext is decryptable using the respective symmetric encryption key generated by the host device.

8. The computer-implemented method of claim 1, wherein presenting the graphical display via each of the plurality of computing devices with the plurality of indicia distributed across the graphical display further comprises randomly distributing the plurality of indicia across the graphical display.

9. The computer-implemented method of claim 1, further comprising discretizing the eye gaze according to a grid of three-dimensional spaces corresponding to potential locations of the plurality of indicia.

10. The computer-implemented method of claim 1, wherein tracking the eye gaze of the first user and the at least one second user further comprises determining that a respective user has completed a respective air tap gesture at each indicium of the sequence of the subset of the plurality of indicia.

11. The computer-implemented method of claim 1, wherein tracking the eye gaze of the first user and the at least one second user further comprises determining that a respective user has completed a respective eye gaze dwell time at each indicium of the sequence of the subset of the plurality of indicia.

12. The computer-implemented method of claim 1, wherein the key sequence cue is a sequence of one to ten digits, from 0 to 9.

13. The computer-implemented method of claim 1, wherein generating the cryptographic key further comprises generating a symmetric encryption key using a Password-based Key Derivation Function version 2.

14. The computer-implemented method of claim 1, wherein identifying the host device and the at least one client device from the plurality of computing devices further comprises sending a network address of the host device to a network via a user datagram protocol (UDP) broadcast.

15. A system for pairing computing devices, the system comprising:

a plurality of computing devices including a host device and at least one client device, the plurality of computing devices being configured to at least:

communicate a key sequence cue to a first user via the host device;

simultaneously present a graphical display via each of the plurality of computing devices with a plurality of indicia distributed across the graphical display;

track an eye gaze of the first user and at least one second user using a respective gaze tracking sensor of the plurality of computing devices, the eye gaze tracing a sequence of a subset of the plurality of indicia corresponding to the key sequence cue; and generate a cryptographic key based at least in part on the eye gaze of the first user and the at least one second user.

16. The system of claim 15, wherein generating the cryptographic key further comprises generating a respective symmetric encryption key in each of the plurality of computing devices based at least in part on the eye gaze of a respective user and the sequence of the subset of the plurality of indicia corresponding to the key sequence cue.

17. The system of claim 16, wherein the plurality of computing devices are further configured to at least:

send a respective ciphertext from the at least one client device to the host device, the respective ciphertext being encrypted using the respective symmetric encryption key generated in the at least one client device;

verify, by the host device, whether the respective ciphertext is decryptable using the respective symmetric encryption key generated by the host device; and pair, by the host device, the at least one client device in response to determining that the respective ciphertext is decryptable using the respective symmetric encryption key generated by the host device.

18. The system of claim 15, wherein the plurality of computing devices are further configured to at least discretize the eye gaze according to a grid of three-dimensional spaces corresponding to potential locations of the plurality of indicia.

19. The system of claim 15, wherein tracking the eye gaze of the first user and the at least one second user further comprises at least one of:

determining that a respective user has completed a respective air tap gesture at each indicium of the sequence of the subset of the plurality of indicia; or determining that the respective user has completed a respective eye gaze dwell time at each indicium of the sequence of the subset of the plurality of indicia.

20. The system of claim 15, wherein presenting the graphical display via each of the plurality of computing devices with the plurality of indicia distributed across the graphical display further comprises randomly distributing the plurality of indicia across the graphical display.

* * * * *